(12) United States Patent
Cotterell (10) Patent No.: US 7,175,310 B1
(45) Date of Patent: Feb. 13, 2007

(54) MOUSE PAD HAVING ILLUMINATED WORKING SURFACE

(76) Inventor: Robert S. Cotterell, 16429 162nd St., Monroe, WA (US) 98272

( * ) Notice: Subject to any disclaimer, the term of this patent is extended or adjusted under 35 U.S.C. 154(b) by 0 days.

(21) Appl. No.: 11/056,018

(22) Filed: Feb. 10, 2005

Related U.S. Application Data (60) Provisional application No. 60/543,864, filed on Feb. 10, 2004.

(51) Int. Cl.
*F21V 33/00* (2006.01)

(52) U.S. Cl. .................. 362/253; 362/602; 362/619

(58) Field of Classification Search ............ 362/31, 362/600, 612, 602, 617, 618, 619, 629, 33, 362/253
See application file for complete search history.

(56) References Cited

U.S. PATENT DOCUMENTS

| | | | |
|---|---|---|---|
| 6,481,131 B2 * | 11/2002 | Gianotti et al. ............. 40/546 |
| 6,530,670 B2 * | 3/2003 | Hirayama .................. 362/628 |
| 6,635,336 B1 * | 10/2003 | Chen et al. ............ 248/346.01 |
| 2002/0131270 A1 * | 9/2002 | Niemuth | |
| 2004/0224107 A1 * | 11/2004 | Lewis | |

OTHER PUBLICATIONS

"Xidew-Pad Ultra II Lighed Mouse Pad" review on www.bitbenderforums.com dated Mar. 29, 2003 pp. 1-7.*
"FlexiGlow FX Pro Game Mouse Pad w/7 co Acrylic Flashing Base" reviews on www.maxdy.com, dated Jul. 20, 2004 to Dec. 10, 2003, pp. 1-5.*
"EverGlide Ray Illuminated Mouse Pad" review, www.techfreaks.org, dated Jun. 24, 2004, pp. 1-2.*

* cited by examiner

*Primary Examiner*—Laura K. Tso
(74) *Attorney, Agent, or Firm*—Todd N. Hathaway (57) ABSTRACT

A mouse pad having a lighted working surface. The surface is illuminated by LEDs, with power being supplied from the USB port of the computer. The LEDs project into a layer of light-transmitting material, such as flexible transparent polyurethane, with the light-transmitting material having a visible upper surface that forms the operating area for the computer mouse. An opaque shield blocks the LEDs from view, so that when energized, only the working area appears illuminated and the LEDs themselves cannot be seen directly. An ornamental design or other article may be mounted or formed in the light-transmitting layer, so that it will be highlighted by the beams of the LEDs and visible through the upper surface of the working area.

31 Claims, 7 Drawing Sheets

MOUSE PAD HAVING ILLUMINATED WORKING SURFACE

RELATED APPLICATIONS

This application claims the benefit of U.S. Provisional Patent Application No. 60/543,864 filed on 10 Feb., 2004.

BACKGROUND a. Field of the Invention

The present invention relates generally to peripheral devices for use with computers, and, more particularly, to a mouse pad having a surface that is illuminated by one or more LEDs to which power is supplied from a USB port on the computer.

b. Related Art

As is well known, mouse pads are accessories that provide a suitable substrate for operation of a computer mouse or similar pointing device. As used in this description and the appended claims, the term "mouse pad" includes all such pads, whether they are used with a mouse per se or another, similar device, or whether they serve an additional function, such as providing support for a user's hand/wrist, for example.

Mouse pads have often been provided with one or more forms of decoration to enhance their visual appeal and create a more interesting environment when working at a computer. In most of these products, artwork (e.g., a drawing or photograph) has been printed onto the upper surface of the pad, either directly on the cushioning material or on a fabric layer that is adhered to the top of the cushioning material. In a few instances, a molded decoration or other structure has been applied to a mouse pad as a variant on this theme.

Although enjoyable in their own right, ordinary decorative mouse pads display only a single image, which of course loses its novelty and therefore its appeal in fairly short order. Some mouse pads have incorporated "holographic" decorations, in which the image changes with the position of the eye, but even these are limited to only a couple of images and therefore very quickly become "old hat".

The artistic efforts applied to mouse pads must of course be tempered by practical considerations relating to the function of the product. For example, a mouse pad must include a generally flat upper surface so as to provide a work area that is suitable for operation of a mouse. It must also be comparatively thin so as to not raise the mouse excessively above the level of the desk or tabletop on which the pad is typically placed. Moreover, although rigid mouse pads are known, it is generally desirable for the pad to be formed of a flexible, somewhat resiliently yielding material, both for comfort and tactile appeal, and for the ability to conform to minor irregularities so that the pad will remain stable and stationary on a variety of work surfaces. Still further, it is imperative that cost be low, since mouse pads are generally considered to be cheap, utilitarian items and therefore will not ordinarily be purchased if priced too highly.

Accordingly, there exists a need for a decorative mouse pad that presents a new form of visual appeal as compared with traditional printed mouse pads and the like. Furthermore, there exists a need for such a mouse pad that is capable of providing variable patterns and appearance so that its visual appeal will be retained over a period of use. Still further, there exists a need for such a mouse pad that has satisfactory ergonomic, tactile and functional qualities for use with a conventional computer mouse or similar device.

Still further, there exists a need for such a mouse pad that can be manufactured economically, yet which is long-lasting and durable in use.

SUMMARY OF THE INVENTION

The present invention has solved the problems cited above, and is a mouse pad having an illuminated working surface. Broadly, this comprises: a layer of light-transmitting material having a visible upper surface for operation of a computer mouse thereon, at least one LED light source mounted to the layer of light transmitting material so as to project a beam of light into the layer, means for providing power to the LED light source, and an opaque shield mounted over the LED light source so that the light source is substantially blocked from view, so that when the at least one LED light source is energized only the upper surface of the layer of light transmitting material appears illuminated and the LED light source is not seen.

The at least one LED light source may comprise a plurality of LEDs mounted at spaced-apart locations. The opaque shield may comprise a layer of opaque material that is mounted over the LEDs. The plurality of LEDs may be mounted along an edge portion of the layer of light-transmitting material, and the layer of opaque material may form an opaque border along the edge portion of the light-transmitting material. The LEDs and border may extend about a perimeter of the layer of light-transmitting material, with the beams of the LEDs being directed inwardly so as to illuminate a central area of the layer of light-transmitting material.

The layer of light-transmitting material may be provided with a textured upper surface or may comprise a layer of translucent material, so that the upper surface of the layer is provided with a soft glow when the LED light sources are illuminated. Conversely, the layer of light transmitting material may comprise a layer of substantially transparent material with a clear upper surface, so that shapes formed or embedded in the layer appear highlighted and illuminated when the LED light sources are energized. The shape in the layer of transparent material may comprise a shape that is recessed into a lower surface of the layer.

The layer of light transmitting material may comprise a layer of soft, resiliently flexible material. The opaque shield over the at least one LED light source may comprise an opaque layer that is formed on an upper surface of said layer of soft, resiliently flexible material. Alternatively, the opaque shield may comprise an opaque layer that is formed on a light-transmitting sheet that is mounted over said layer of light-transmitting material. Said light-transmitting sheet may comprise an upper surface having texturing sufficient to ensure proper operation of a computer mouse thereon. The soft, resiliently flexible material may comprise a molded polyurethane material, and the light-transmitting sheet may comprise a sheet of polyurethane film material.

The LED light sources may be mounted to the layer of light transmitting material in a flexible frame, so that the assembly bends substantially as a unit when flexed. Alternatively, the LED light sources may be embedded in the layer of light transmitting material together with a flexible harness, so that the assembly bends substantially as a unit when flexed. The flexible harness may comprise a plurality of flexible wires, or may comprise a plurality of circuit board members mounted together in articulated relationship.

The means for supplying power to the at least one LED light source may comprise a cable for attachment to a USB port of a computer. The means for supplying power to the at least one LED light source may further comprise means for supplying power to a first set of LEDs having a first color, and for supplying power to a second set of LEDs having a second color, so that the first and second sets of LED light sources project beams having first and second colors. The assembly may also comprise means for flashing the LEDs on-and-off so as to create a varying pattern of illumination in the layer of light-transmitting material.

These and other features and advantages of the present invention will be more fully understood from a reading of the following detailed description with reference to the accompanying drawings.

DETAILED DESCRIPTION

Figure 1:
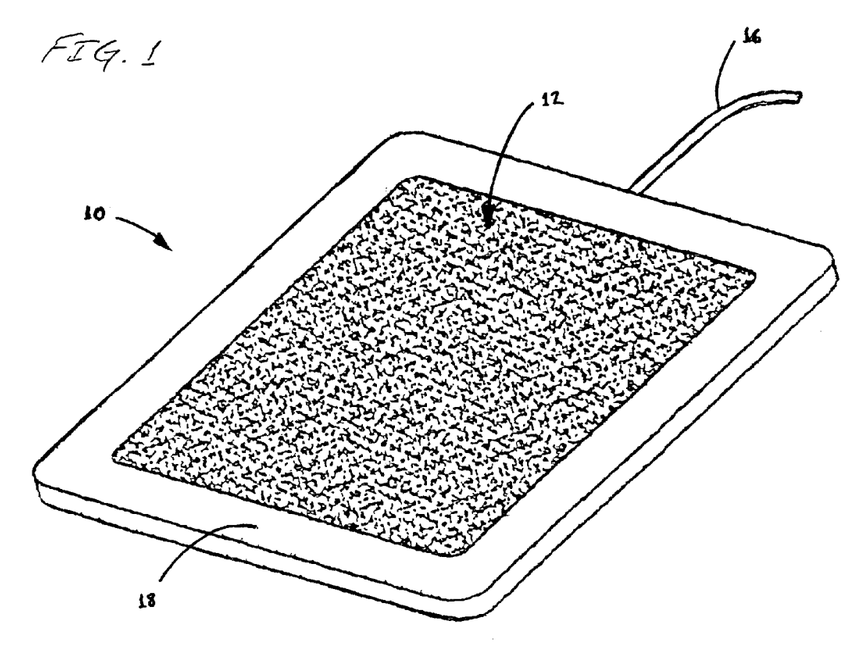
FIG. 1 is a perspective view of an illuminated mouse pad in accordance with the present invention, showing the light-transmitting material of the working area and the opaque border about the perimeter that shields the light sources from direct view.

FIG. 1 shows a lighted mouse pad assembly 10 in accordance with a preferred embodiment of the present invention. The assembly includes a working area 12 having a generally flat upper surface for operation of the mouse or other pointing device, and which is formed of one or more layers of light-transmitting (i.e., transparent or translucent) material. A plurality of LEDs 14, are mounted about the perimeter of the pad so that the beams thereof are projected inwardly towards the working area, with power being supplied to the LEDs from a USB port of the computer via a power cable 16.

The LEDs are shielded from direct view by a substantially opaque border 18 that extends above the LEDs and inwardly towards the working area. The upper surface of the working area is provided with a fine texturing that both intercepts the light and provides traction for non-optical mice. In this manner, a diffuse glow is created over the visible surface of the working area; as will be described in greater detail below, this can be produced in a variety of patterns and have one or more colors. At the same time, the opaque border prevents the light of the LEDs from being seen directly by the eye, thus avoiding visual "hot spots" that would tend to overwhelm and detract from the glowing appearance and would also tend to distract and annoy the user. It will be understood, however, that in some embodiments the opaque border may not be completely or totally opaque and may partially allow light from one or more of the LEDs to pass therethrough.

Both the light-transmitting working area and the opaque border are formed of layers of resiliently flexible materials that can bend and flex without separating. In the preferred embodiment, the material of at least the working area is also resiliently compressible so as to impart a slight cushioning quality to the pad.

In the embodiment that is illustrated in FIG. 1, the pad assembly has a square, flat configuration, with the LED light sources and opaque border extending around the entire perimeter of the working area. This provides a pad that is particularly well-lit as well as being highly functional, however, it will be understood that in other embodiments the assembly may not be entirely flat or planar; for example, a wrist pad formed of gel or other cushioning material may be included, as well as other forms of supports, attachments, accessories and so on. Moreover, the LEDs and opaque shielding layer may not extend around the entire perimeter of the working area, and may instead be limited to one or more edges or to a particular area of the pad. The shielding may also be provided with decoration (e.g., printing) or have a decorative pattern. Still further, the opaque shield may in some embodiments be associated with or even mounted to or made a part of individual LEDs, rather than having the form of a continuous border that covers several LEDs together.

Figures 2A, 2B:
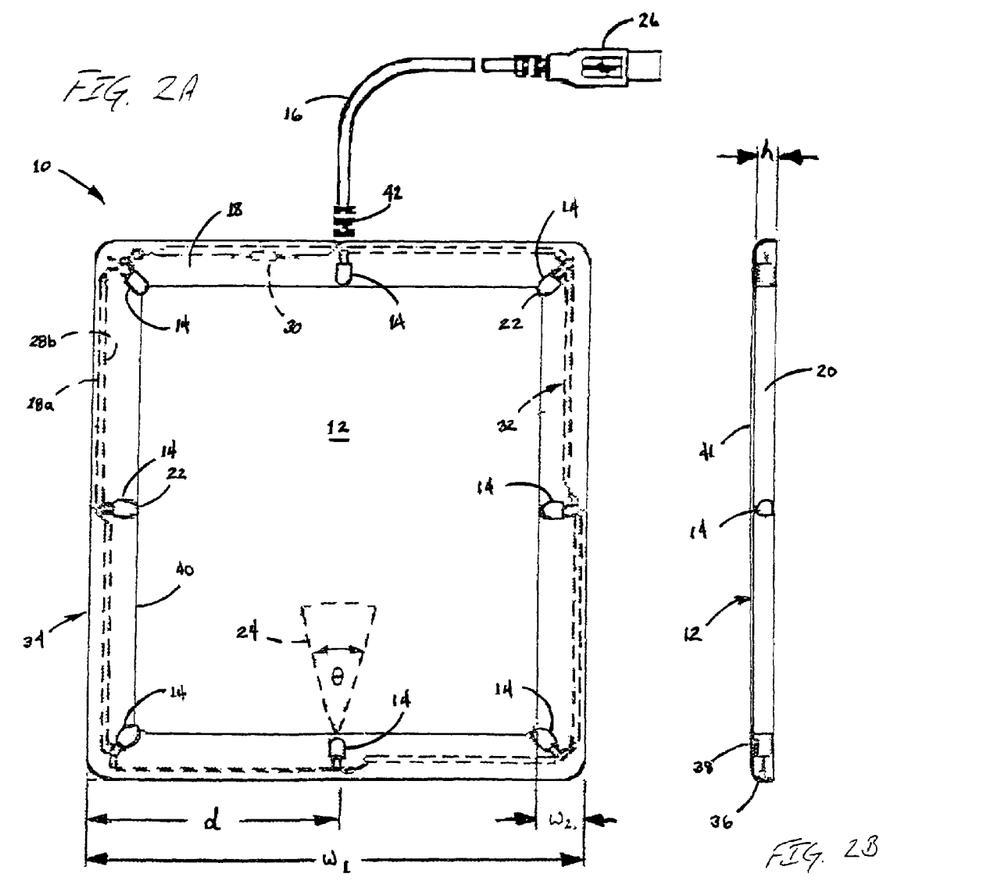
FIG. 2A is a plan view of the illuminated mouse pad of FIG. 1, showing the positioning of the LEDs beneath the opaque border and the paths along which light is projected into the light-transmitting material of the working area.
FIG. 2B is a side, elevational view of the mouse pad of FIG. 2A, showing the profile of the pad and the orientation of the LED light sources in greater detail.

As can be seen in FIGS. 2A–2B, the primary structural component of the pad assembly is the layer 20 of transparent or translucent material that forms the working area 12. The layer 20 is formed of a resiliently flexible material, such as molded polyurethane, vinyl, or other flexible plastic. The material may be translucent or transparent with a textured (e.g., grainy surface) so as to create a glowing effect, or it may be transparent with a smooth, clear surface so as to illuminate an article or pattern that is formed or embedded in the layer, as will be described in greater detail below. In general, however, the upper surface should have at least a slight degree of texturing (although not necessarily so pronounced as to be visible to the naked eye or to affect the clarity of an underlying image) and should not be completely glossy and slick, in order to ensure proper operation of both mechanical and optical mice; conversely, the upper surface in general should not be so coarsely textured as to interfere with the smooth, "gliding" operation of such devices.

As can be seen with further reference to FIG. 2A, the thickness "h" of the translucent/transparent layer 20 is preferably approximately equal to or greater than the diameter of the LEDs 14, so that substantially the entire beam of each LED is captured within the material that forms the layer; for the majority of suitable, commercially available LEDs, a thickness "h" of approximately 0.3–0.4 inches is generally satisfactory.

The LEDs 14 are positioned at spaced locations about the perimeter of the pad, with their emitting ends 22 disposed inwardly towards the working area 12 so that each LED will project a beam 24 in this direction. The LEDs may be of any suitable type, including, for example, conventional round/oval LEDs and surface-mount LEDs (SMDs). In the illustrated embodiment, the LEDs are retained in a frame that is in turn mounted to the edge of the transparent/translucent layer 20 and that includes the opaque border, however, it will be understood that the LEDs may also be mounted directly in openings or bores formed in the translucent/transparent material itself or even cast or molded within the material of the layer, since the low operating temperature of LEDs permits this to be done without causing degradation of the plastic material.

In a square or rectangular pad, the LEDs are suitably arranged with their axes of projection aligned generally normal to the edges of the working area 12, with the LEDs in the corners being aligned to project in a diagonal direction. This creates substantially complete illumination of the working area, with a subtle, appealing pattern being created by the interplay of the crisscrossing beams at the center.

The pattern that is formed varies somewhat depending on the beam angle of the particular LEDs that are used. By way of background, it will be understood that LEDs are ordinarily supplied in standardized beam widths, e.g., a narrow angle LED may project a beam through an angle of about 15°, while another may project a broader beam through an angle of about 45°; the light output, however, is more or less constant, so that as a rule a narrower beam will be brighter than a broader one. LEDs having a projection angle "θ" of about 30° have been found particularly advantageous for use in the embodiment which is illustrated in the drawings, since beam angles narrower than this provide much less uniform illumination, while LEDs with broader projection angles tend to be too dim and provide inadequate illumination at the center of the working area. The square pad assembly 10 that is shown in the drawings has a width "$w_1$" of 8.0 inches, with eight 30° LEDs mounted along the edges at a spacing "d" of 4.0 inches.

Figure 5:
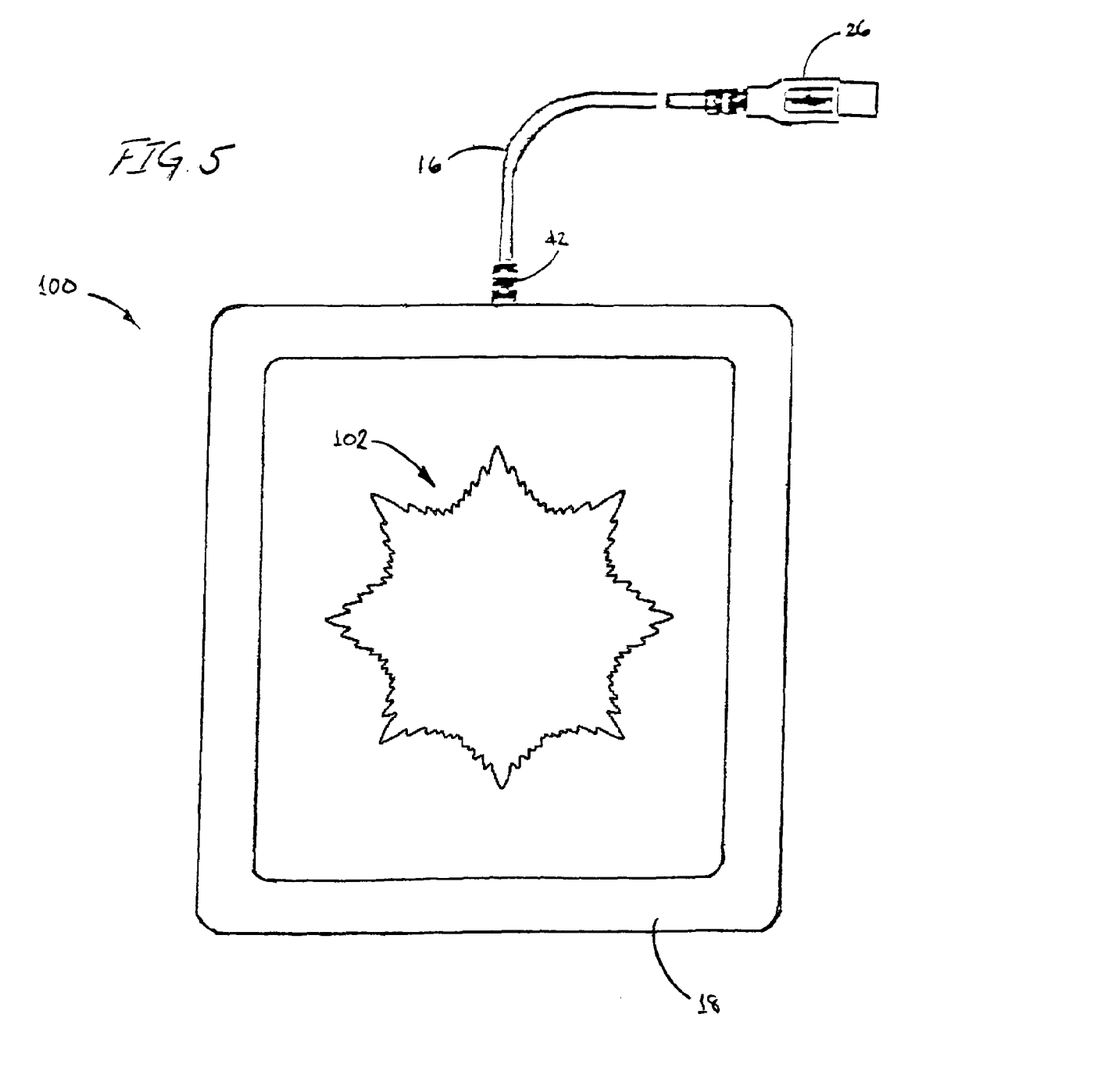
FIG. 5 is a top, plan view, similar to FIG. 2A, of a mouse pad in accordance with a third embodiment of the present invention in which ornamentation within the layer of light-transmitting material is highlighted by beams from the LED light sources.
Figure 6A:
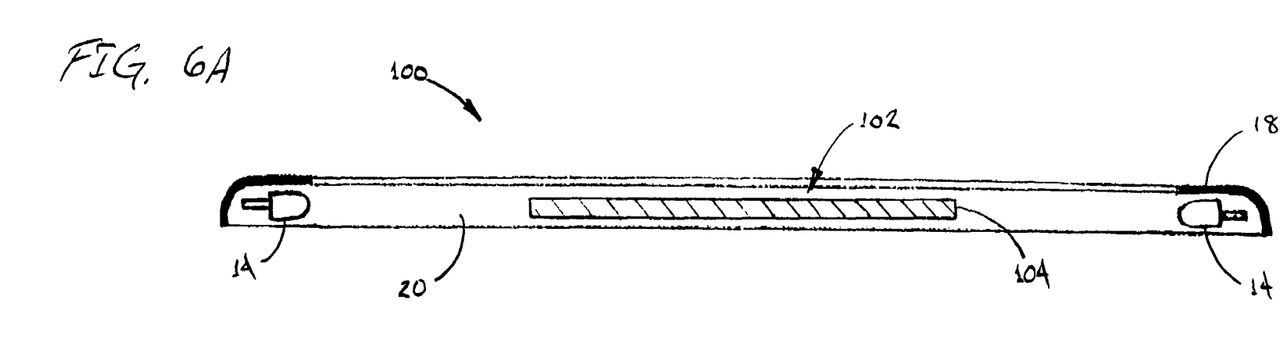
FIG. 6A is a cross-sectional view of the mouse pad of FIG. 5, showing the manner in which the ornamentation is formed by an object that is embedded in the layer of light-transmitting material.
Figure 6B:
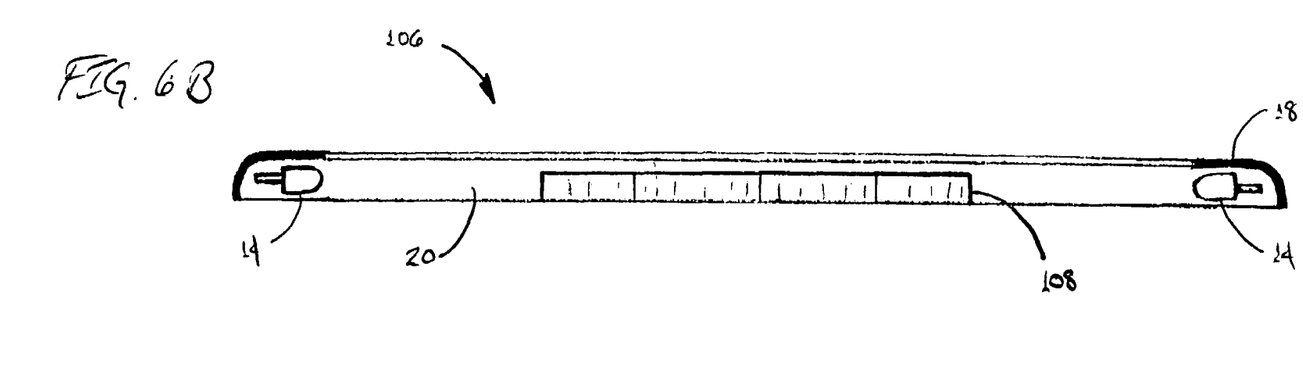
FIG. 6B is a cross-sectional view of a mouse pad in accordance with the present invention, similar to FIG. 6A, showing the manner in which the ornamentation is alternately formed by a recess extending upwardly from the lower surface of the layer of light-transmitting material.

As noted above, where a translucent or texture-surfaced transparent material may be employed to diffuse the light from the LEDs so as to produce a "glowing" effect, so that the entire upper surface of the working area 12 is provided with a soft, diffuse illumination; depending on the width/intensity of the beams, the areas directly along the paths of the beams may be somewhat brighter, thus forming a somewhat star-shaped pattern or other effect that may increase visual appeal. By contrast, in embodiments where the layer is formed of a substantially clear-surfaced transparent material, the beams will tend to illuminate or highlight features/articles that are formed or embedded within the layer, rather than the material itself; for example, artwork (e.g., a logo) may be engraved, cast or otherwise formed in the back of the transparent layer to form raised areas that reflect the light, so that the highlighted image is visible through the top of the working area (e.g., giving an appearance similar to etched glass). For example, FIG. 5 shows a mouse pad 100 having ornamentation 102 in the layer of light-transmitting material. As can be seen in FIG. 6A, the ornamentation may be formed by a body 104 that is embedded in the layer of light-transmitting material; alternatively, FIG. 6B shows a mouse pad 106 in which the ornamentation is formed by a recess 108 that extends upwardly into the light-transmitting material from the lower surface thereof.

Power is supplied to the LEDs from the computer to which the mouse is attached, via cord 16 and a plug 26 for connection to a USB port. As is well known in the art, a USB port is included on most current-generation computers and supplies a low-voltage output (+5 V, 0.5 A) for operation of peripheral devices; in addition, the USB port communicates data by which operation of the LEDs may be controlled (e.g., flashed on-and-off, as will be described below). LEDs are ideally suited for use with USB port power due to their low current draw and compatible voltage characteristics. Moreover, a hub may be connected to power multiple devices from a single port, e.g., both the pad assembly and an associated mouse.

The LEDs 14 receive the power from the cord via leads 28a, 28b. A resistor 30 is mounted in one of the leads to control the voltage and milliamperage to the levels specified for the LEDs; the majority of available LEDs suitable for use in the present invention are designed for operating voltages in the range from about 2.1–4.9 V. In addition, multicolored LEDs may be employed in some embodiments of the invention, in which the color of the light emitted by the LED depends on the voltage and can therefore be controlled or varied by the value of the resistor.

The power leads, resistor and LEDs are soldered together or otherwise attached to form a flexible wiring harness 32. The harness is suitably formed of segments of printed circuit board, articulated at the soldered connections in order that the harness is able to flex together with the frame, or it may be formed of flexible circuit board material or flexible wires.

The wiring harness is mounted to a flexible frame 34, which in turn is formed of an opaque, flexible material, such as a molded plastic for example. In the illustrated embodiment, the frame includes a depending, radiused lip 36 (see FIG. 2B) that encloses the edge of the assembly, as well as an inwardly-projecting flange 38 that forms the opaque border 18 (see FIG. 1). In order to shield the LEDs from direct view by the user, the opaque border extends inwardly to an edge 40 that at least covers the projecting ends 22 of the LEDs, and preferably slightly further; the flange 38 of the opaque frame in FIGS. 2A–2B has a width "$w_2$" of about 0.75 inch.

The flexible frame 34, including the associated wiring harness and LEDs, is adhered, bonded or otherwise mounted to the edges of the light transmitting layer 20 so that the resulting assembly flexes as a unit. It will be understood, however, that in some embodiments the frame may have greater (or less) rigidity than the transparent/translucent layer as noted above, that forms the working area.

Moreover, other embodiments may employ a different form of frame or no frame at all. For example, in a second preferred embodiment, the opaque border is screen printed or otherwise formed on a transparent polyurethane film having a suitable surface texturing (e.g., see film 41 in FIG. 2B). The film is placed in an inverted orientation in a shallow, open-face vacuum mold, so that the vacuum keeps the film flat and maintains it in position. Liquid polyurethane is then poured into the mold over the film, and the harness is set within the material while it is still fluid so that the harness sinks into and becomes encased within the polyurethane layer. When cured, the two polyurethane layers form a bonded, flexible structure (a suitable surface treatment may be applied to the film layer, if desired, in order the enhance the permanence of the board between the two layers). In addition, a strain relief 42 (which prevents damage to the cord where it meets the edge of the pad) is preferably installed around the base of the power cord, by placing this about the latter at an opening where the cord exists the mold cavity.

It will be understood that the pad assembly can be produced by a variety of other techniques and processes, including lamination and injection molding, for example. Moreover, the opaque border may be formed by simply printing or otherwise applying a layer of opaque material directly to the main light-transmitting layer, rather than using a separate film or sheet as described in the preceding paragraph.

Figure 3:
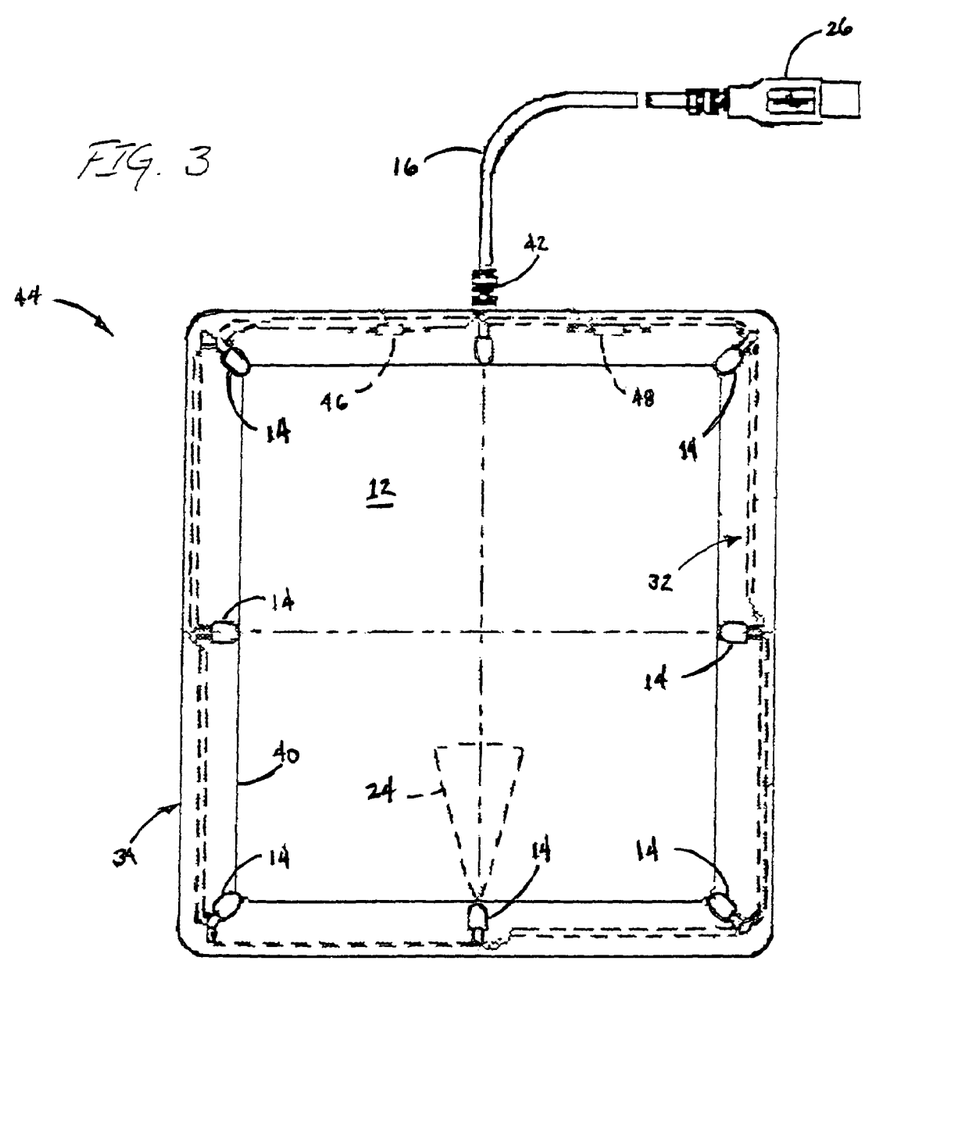
FIG. 3 is a top, plan view, similar to FIG. 2A, of a mouse pad in accordance with a second embodiment of the present invention in which the LED light sources project beams in two different colors, as opposed to the single color that is produced in the embodiment that is shown in FIG. 1A.

FIG. 3 shows a pad assembly 44 that is substantially identical to that which has been described above with reference to FIGS. 2A–2B, except that this includes two sets of LEDs having different colors, and separate resistors 46, 48. The two resistors have values matched to the requirements of their respective LEDs and are mounted in separate power leads, so that the first resistor 46 controls the supply voltage/current supplied to the first group of the LEDs and the second resistor 48 controls that supplied to the remaining group of LEDs. In this manner, the pad assembly is provided with LEDs that project light in two different colors; for example, and the pad assembly that is illustrated in FIG. 3, one half of the LEDs may project a green color and the other half may project a red color. More colors can be added by simply including additional sets of LEDs with associated leads and resistors (or equivalent components), as desired.

Figure 7:
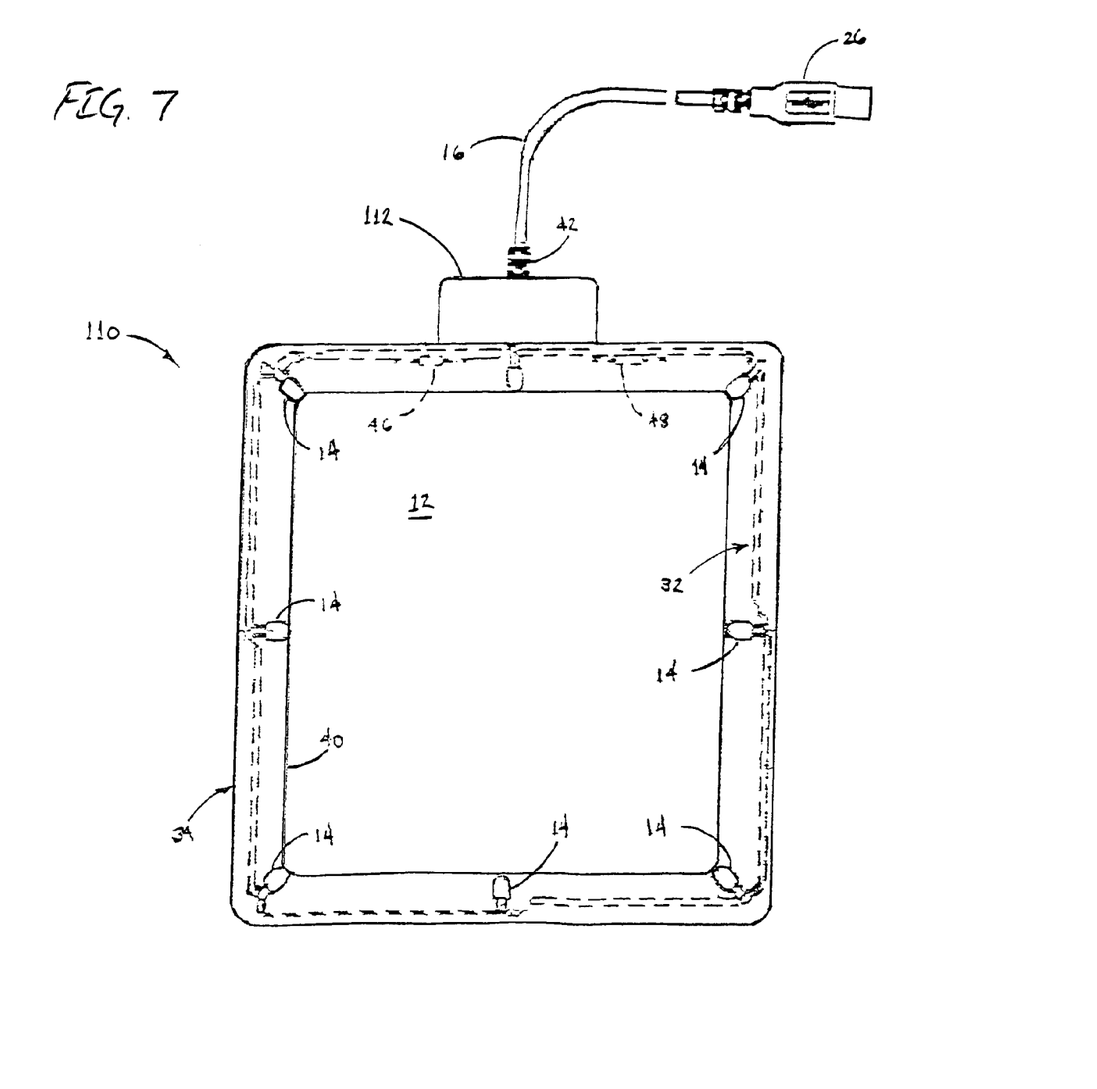
FIG. 7 is a top, plan view, similar to FIG. 2A, of a mouse pad in accordance with a fourth embodiment of the present invention in which the LED light sources are flashed on-and-off by a switching device mounted to the pad.

Furthermore, in some embodiments the pad assembly may be configured so that the LEDs are energized on a periodic basis, i.e., "flashed" on-and-off, so as to produce a changing pattern and therefore enhanced visual interest. Operation of the LEDs (e.g., the sequence or pattern in which they are illuminated) may be controlled for the computer via the USB port, employing suitable software operating on the computer system, or, as can be seen in FIG. 7, in some embodiments operation may be controlled by an IC controller or other device 112 within or mounted to the pad assembly 110 itself.

Figure 4:
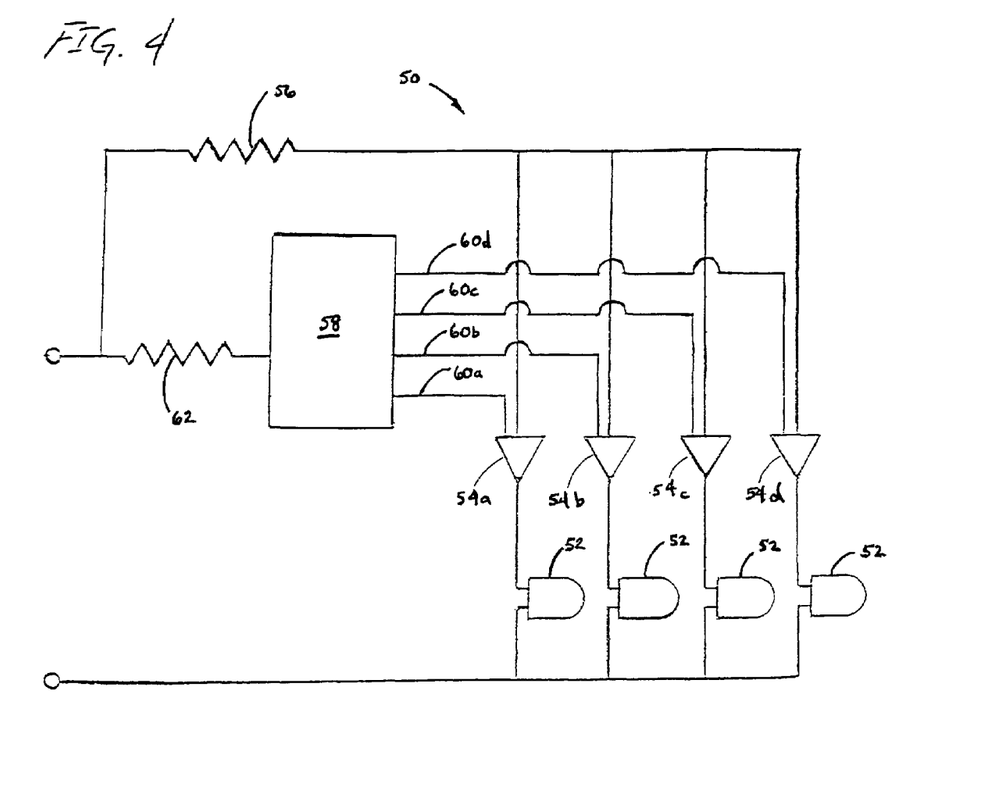
FIG. 4 is a simplified, diagrammatic view of a circuit for controlled intermittent illumination of the LED light sources in accordance with a third embodiment of the present invention.

FIG. 4 illustrates one example of a circuit 50 for flashing the LEDs on-and-off (in this case, only four LEDs are shown, but it will be understood that there may be any number), in which the control mechanism can be made a part of the pad assembly itself. As can be seen, power to the LEDs 52 is controlled by switches 54*a*–d, with the voltage being controlled at the desired level by a resistor 56. The switches may suitably be MOSFETS, SCRs, SCSs, or equivalent devices. Current to gate the switches on/off is provided from a controller 58 via leads 60*a*–d. The controller may suitably be provided by an IC timer (with associated components) or other device known to those skilled in the art; the controller may be configured or pre-programmed to energize the LEDs in accordance with a set pattern, or it may be selectively programmable to allow the user to adjust the pattern as desired. Voltage supplied to the controller is set at the appropriate level by a second resistor 62.

Circuit 50 is shown in FIG. 4 in a somewhat simplified fashion for ease of illustration, and it will be understood that the actual layout will depend on the choice of switching devices, the type of timer/controller used, and other design factors. Moreover, it will be understood that an integrated control device may be used rather than switch devices and a separate control circuit, and as noted above, that the operation of the LEDs may be controlled from the computer that is associated with the mouse by rather than by a circuit or mechanism within the pad assembly itself.

It is to be recognized that various alterations, modifications, and/or additions may be introduced into the constructions and arrangements of parts described above without departing from the spirit or ambit of the present invention.

What is claimed is:

1. A mouse pad, comprising:
   a layer of light-transmitting material having a visible upper, working surface for operation of a computer mouse thereon, said layer of light-transmitting material comprising:
   a layer of soft, resiliently flexible light-transmitting material;
   at least one LED light source mounted to said layer of light-transmitting material so as to project a beam of light into said layer;
   means for supplying power so as to selectively energize said at least one LED light source; and
   a substantially opaque shield mounted over said at least one LED light source so that said light source is substantially blocked from view;
   so that when said at least one LED light source is energized only said upper working surface of said layer of light-transmitting material appears illuminated and said LED light source is not seen.

2. The mouse pad of claim 1, wherein said at least one LED light source comprises:
   a plurality of LEDs mounted at spaced-apart locations.

3. The mouse pad of claim 2, wherein said substantially opaque shield comprises:
   a layer of substantially opaque material that is mounted over said LEDs.

4. The mouse pad of claim 3, wherein said LEDs are mounted along an edge portion of said layer of light-transmitting material, and wherein said layer of opaque material forms a border along said edge portion of said layer of light-transmitting material.

5. The mouse pad of claim 4, wherein said LEDs and said border extends about a perimeter of said layer of light-transmitting material, and wherein said LEDs have beams that are directed inwardly so as to illuminate a central area of said layer of light-transmitting material.

6. The mouse pad of claim 5, wherein said layer of light-transmitting material comprises:
   a textured upper surfaces that diffuses said beams of said LEDs, so as to provide said pad with a soft glow when said LEDs are energized.

7. The mouse pad of claim 5, wherein said layer of light-transmitting material comprises:
   a layer of generally translucent material that diffuses said beams of said LEDs, so as to provide said pad with a soft glow when said LEDs are energized.

8. The mouse pad of claim 5, wherein said layer of light-transmitting material comprises:
   a layer of transparent material having a substantially clear upper surface, so that ornamentation within said layer appear highlighted by said beams of said LEDs when said LEDs are energized.

9. The mouse pad of claim 8, wherein said ornamentation within said layer of light-transmitting material comprises:
   an object that is embedded within said layer of light-transmitting material.

10. The mouse pad of claim 8, wherein said ornamentation within said layer of light-transmitting material comprises:
    a recess that is formed within a lower surface of said layer of light-transmitting material so that said recess extends upwardly therein.

11. The mouse pad of claim 1, wherein said opaque shield mounted over said at least one LED light source comprises:

an opaque layer that is formed on an upper surface of said layer of soft, resiliently flexible light-transmitting material.

12. The mouse pad of claim 1, wherein said opaque shield is mounted over said at least one LED light source comprises:
an opaque layer that is formed on a light-transmitting sheet that is mounted atop said layer of soft, resiliently flexible light-transmitting material.

13. The mouse pad of claim 12, wherein said light-transmitting sheet comprises:
an upper surface having texturing sufficient to ensure proper operation of a computer mouse thereon.

14. The mouse pad of claim 13, wherein said soft, resiliently flexible material comprises:
a light-transmitting molded polyurethane material.

15. The mouse pad a claim 14, wherein said light-transmitting sheet comprises:
a sheet of light-transmitting polyurethane film material that is bonded to said molded polyurethane material.

16. The mouse pad of claim 1, further comprising:
a flexible wiring harness having said LEDs mounted thereto.

17. The mouse pad of claim 16, further comprising a flexible frame having said LEDs and wiring harness mounted thereto, said flexible frame forming said opaque shield over said LEDs and being mounted to said layer of soft, resiliently flexible material so as to bend therewith when said pad is flexed.

18. The mouse pad of claim 16, wherein said flexible harness is embedded in said layer of soft, resiliently flexible material so as to bend therewith when said pad is flexed.

19. The mouse pad of claim 1, wherein said means for supplying power so as to selectively energize said at least one LED light source comprises:
a cable for attachment to a USB port of a computer.

20. The mouse pad of claim 19, wherein said means for supplying power further comprises:
means for flashing said at least one LED light source on-and-off so as to create a varying pattern of illumination in said layer of light-transmitting material.

21. The mouse pad of claim 20, wherein said means for flashing said at least one LED light source on-and-off comprises:
a software program installed on said computer so as to control power supplied via said USB port.

22. The mouse pad of claim 20, wherein said means for flashing said at least one LED light source comprises:
a switching device mounted to said pad so as to control power supplied from said USB port.

23. A mouse pad, comprising:
a layer of resiliently flexible light-transmitting material having a visible upper, working surface for operation of a computer mouse thereon;
a plurality of LEDs mounted at spaced-apart locations about a perimeter of said layer of light-transmitting material, said LEDs having beams that are directed generally inwardly so as to illuminate a central area of said layer of light-transmitting material;
a cable for connecting said LEDs to a USB port of a computer so that said LEDs are energizable by power supplied therefrom;
an opaque layer mounted over said LEDs so that said LEDs are substantially blocked from view, said opaque layer extending over said LEDs so as to form an opaque border substantially about said perimeter of said layer of light-transmitting materials, so that when said LEDs are energized only said upper, working surface in said central area of said layer of light-transmitting material appears illuminated in and said LEDs are not seen directly; and
surface texturing on said upper surface of said layer of light-transmitting material sufficient to ensure proper operation of a computer mouse thereon.

24. A mouse pad, comprising:
a layer of light-transmitting material having a visible upper, working surface for operation of a computer mouse thereon;
at least one LED light source mounted to said layer of light-transmitting material so as to project a beam of light into said layer;
means for supplying power so as to selectively energize said at least one LED light source, said means for supplying power so as to selectively energize said at least one LED light source comprising a cable for attachment to a USB port of a computer; and
a substantially opaque shield mounted over said at least one LED light source so that said light source is substantially blocked from view;
so that when said at least one LED light source is energized only said upper working surface of said layer of light-transmitting material appears illuminated and said LED light source is not seen.

25. The mouse pad of claim 24, wherein said at least one LED light source comprises:
a plurality of LEDs mounted at spaced-apart locations.

26. The mouse pad of claim 25, wherein said substantially opaque shield comprises:
a layer of substantially opaque material that is mounted over said LEDs.

27. The mouse pad of claim 26, wherein said LEDs are mounted along an edge portion of said layer of light-transmitting material, and wherein said layer of opaque material forms a border along said edge portion of said layer of light-transmitting material.

28. The mouse pad of claim 27, wherein said LEDs and said border extends about a perimeter of said layer of light-transmitting material, and wherein said LEDs have beams that are directed inwardly so as to illuminate a central area of said layer of light-transmitting material.

29. The mouse pad of claim 24, wherein said means for supplying power further comprises:
means for flashing said at least one LED light source on-and-off so as to create a varying pattern of illumination in said layer of light-transmitting material.

30. The mouse pad of claim 29, wherein said means for flashing said at least one LED light source on-and-off comprises:
a software program installed on said computer so as to control power supplied via said USB port.

31. The mouse pad of claim 29, wherein said means for flashing said at least one LED light source comprises:
a switching device mounted to said pad so as to control power supplied from said USB port.

\* \* \* \* \*